March 18, 1924.
S. W. EVERETT
1,487,549
LIGHTING SYSTEM
Filed Jan. 5, 1906
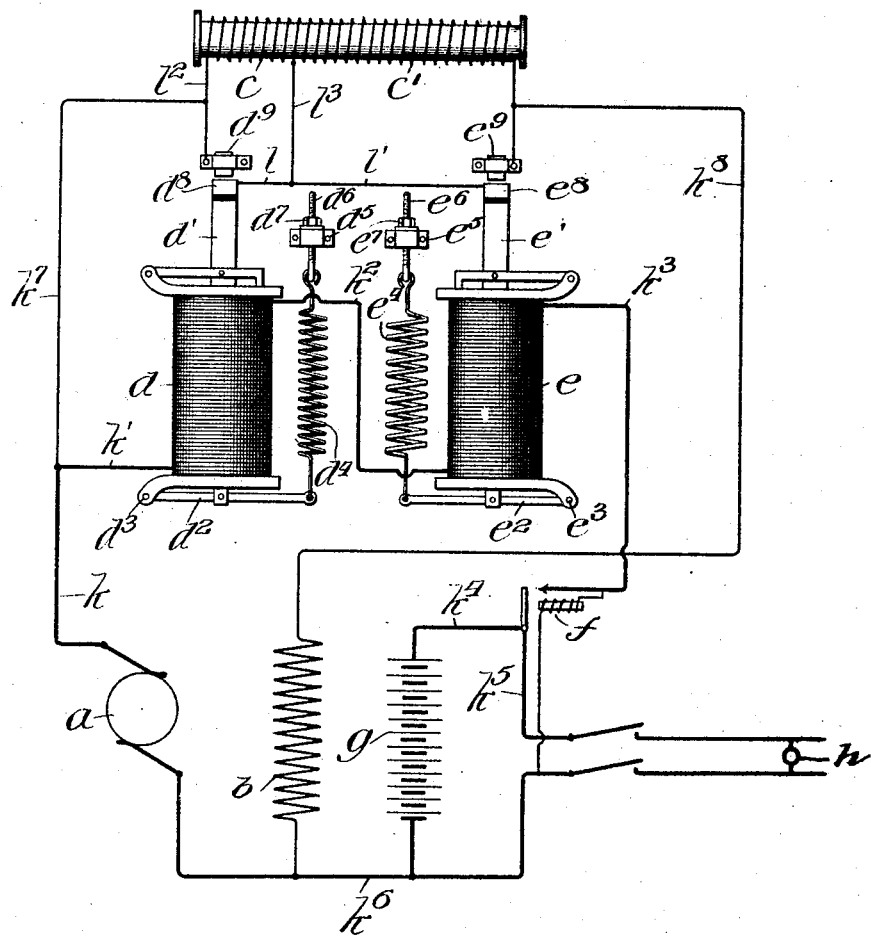

Patented Mar. 18, 1924.

1,487,549

UNITED STATES PATENT OFFICE.

STEPHEN W. EVERETT, OF TOPEKA, KANSAS.

LIGHTING SYSTEM.

Application filed January 5, 1906. Serial No. 294,785.

*To all whom it may concern:*

Be it known that I, STEPHEN W. EVERETT, a citizen of the United States, residing at Topeka, in the county of Shawnee and State of Kansas, have invented certain new and useful Improvements in Lighting Systems, of which the following is a specification.

My invention relates to an electric lighting system.

It will be explained by reference to a railway car lighting system, but of course, it may be applied to lighting systems for other purposes.

The system in general comprises a variable speed generator, a storage battery charged thereby, and lamps operated by either the generator or the storage battery.

When the generator is running above a critical speed, it has to be regulated to keep its energy from becoming excessive.

The regulators that have previously been employed in practice were rather complex as they were designed to be sufficiently sensitive to respond to incipient variations in energy and thereby keep the energy practically constant.

The lighting system of this invention employs a vibratory regulator which alternately inserts and removes in rapid succession a fixed field resistance and thereby causes the energy to fluctuate between two limits.

This invention has as an object to provide the system with a simple, efficient, durable and reliable vibratory regulator.

Another object is to provide the system with a vibratory regulator which is positive and stable in action.

Another object is to provide a method of regulation which is simple, efficient and reliable and which enables a simple vibratory regulator to be employed.

According to this invention, the regulator comprises a fixed resistance arranged in the shunt field circuit, an electromagnet or winding arranged to respond to the generator energy, and a switch operated by an electromagnet to insert and remove the fixed resistance.

When the regulator is in operation, the switch is opened and closed in rapid succession, and thereby the fixed resistance is alternately inserted and removed to keep the energy within two limits and cause it to definitely and perceptibly rise and fall between such limits.

The energy so fluctuates between two limits that the average energy is substantially constant.

While the generator is running above a critical speed, for instance the speed at which the generator voltage equals the battery voltage, its energy seeks to rise higher than is permissible and then the regulator inserts and removes the resistance to keep its energy fluctuating between two definite limits.

When the energy reaches the upper limit the entire resistance is instantly inserted, and when it reaches its lower limit the entire resistance is instantly removed.

Accordingly the energy is fluctuated between two limits and these fluctuations cause the regulator to act to insert and remove the resistance.

The fluctuations in energy are sufficiently wide to give the regulator a positive and stable action.

The battery makes it feasible to have wide fluctuations in energy, as it absorbs such fluctuations and thereby keeps the energy upon the lamps substantially constant.

The invention will be further explained by reference to the railway car lighting system diagrammatically illustrated in the accompanying drawing.

This system will be assumed to be a thirty (30) volt system in which thirty (30) volt lamps and a thirty (30) volt storage battery are employed and the generator develops thirty (30) volts at a speed corresponding to about twenty (20) miles per hour.

Of course, the system may be designed for any voltage according to the purpose for which it is to be employed.

The generator is provided with an armature $a$ and a shunt field winding $b$. The armature may be driven from the car axle in any suitable manner. From the generator extends a main circuit, which leads to a storage battery $g$ and a translating device $h$.

I shall now describe the apparatus which comprises the regulator that I employ to regulate the generator. I provide two resistances $c$ and $c'$ which are connected in series in the shunt field circuit. The resistance $c'$ is greater than the resistance $c$. The operation of the regulator is controlled by means of two electro-magnetic windings $d$ and $e$. Each of these windings is connected in the main circuit in series with the armature.

The electro-magnetic winding $d$ is provided with a plunger $d'$, the lower end of which it attached to a lever $d^2$. One end of the lever is pivoted upon a pivot $d^3$, and the other end thereof is attached to a spring $d^4$, which is connected to means for adjusting the tension of the same. These means comprise a stationary bracket $d^5$, through which passes a bolt $d^6$, to which the spring $d^4$ is attached. The bolt is provided with a nut $d^7$, which rests upon the bracket $d^5$. By means of this nut the tension of the spring may be adjusted.

The resistance $c$ is connected to two electrodes $d^8$ and $d^9$, which are so connected in circuit that when the same are in contact said resistance is short-circuited. The electrode $d^8$ is mounted upon the top of the plunger $d'$, and the electrode $d^9$ is mounted in a stationary position. The spring $d^4$ causes the electrode $d^8$ to make contact with the electrode $d^9$.

The electro-magnetic winding $e$ is provided with a plunger $e'$, the lower end of which is attached to a lever $e^2$. One end of the lever $e^2$ is pivoted upon a pivot $e^3$, and the other end thereof is connected to a spring $e^4$, which is attached to means for adjusting the tension thereof. These means may consist of a stationary bracket $e^5$, through which extends a bolt $e^6$, which is connected to the spring $e^4$. The bolt is provided with a nut $e^7$, which rests upon the bracket $e^5$, and by means of said nut the tension of the spring $e^4$ may be adjusted.

The resistance $c'$ is connected to electrodes $e^8$ and $e^9$, which are so connected in circuit that when the same are in contact said resistance is short-circuited. The electrode $e^8$ is mounted upon plunger $e'$, and the electrode $e^9$ is mounted in a stationary position. The spring $e^4$ causes the electrode $e^8$ to make contact with the stationary electrode $e^9$.

The main circuit is preferably controlled by means of a switch $f$, which is adapted to be closed by means of a potential coil. This switch may assume any suitable form, and is preferably adapted to close the main circuit when the train speed becomes sufficient for the generator voltage to equal that of the storage battery.

The electro-magnet $d$ is preferably adapted to respond to a lower current than the electro-magnet $e$, so that, the electro-magnet $d$ will attract its plunger at less current than the electro-magnet $e$. This result may be obtained by making the spring $e^4$ of greater tension than the spring $d^4$, but it will be understood that it may be accomplished in various other ways, as, for instance, the windings may be provided with different numbers of ampere turns.

I shall now describe the operation of my system, and shall assume certain conditions which may exist in practice. When the train is at rest, the storage battery furnishes the current to operate the lamps and the main circuit is opened by the switch $f$, so that there will be no discharge of the battery back through the generator armature and field. When the train commences to run and reaches about 15 miles per hour, the automatic switch will close and current will flow from the generator through the main circuit to the storage battery and lamps. When the generator voltage is above the battery voltage, the generator will not only furnish all the current to operate the lamps, but will also send current through the storage battery to charge the same. When the generator is operating the lamps and charging the storage battery, current will flow from the armature $a$, through conductor $k$, conductor $k'$, winding $d$, conductor $k^2$, winding $e$, conductor $k^3$, and switch $f$, then it will divide and a part will flow to the storage battery $g$, and another part through the lamps $h$, and finally it will reunite and return through conductor $k^6$ to the armature $a$.

It may be assumed that the electro-magnetic winding $d$ is adapted to respond when the generator delivers about 25 amperes, and the electro-magnetic winding $e$ is adapted to respond when the generator delivers about $27\frac{1}{2}$ amperes.

While the current delivered by the generator is less than say 25 amperes, as would be the case when the train is running at less than twenty (20) miles per hour, the resistances $c$ and $c'$ are short-circuited by the electrodes and the field circuit extends from the armature $a$, through conductor $k$, conductor $k^7$, electrodes $d^9$ and $d^8$, conductors $l$ and $l'$, electrodes $e^8$ and $e^9$, conductor $k^8$ and field winding $b$, back to the armature.

When the main current tends to rise above twenty-five (25) amperes the electro-magnetic winding $d$ responds and separates the electrode $d^8$ from the electrode $d^9$, and accordingly the resistance $c$ is inserted, thereby reducing the current that flows through the field winding. The field current then flows through conductor $l^2$, resistance $c$ and conductor $l^3$, to conductor $l'$, instead of through the electrodes $d^8$ and $d^9$. When the current decreases the electro-magnet allows the electrodes to make contact again and short circuit the resistance $c$ and then the current increases until the electrodes are opened to re-insert the resistance. The regulator thus alternately inserts and removes the resistance in rapid succession, and hence, the generator is regulated to keep its current rapidly fluctuating between two limits.

Inasmuch as the resistance is in and out of circuit in rapid succession, the magnetism of the field varies within comparatively narrow limits. The mean strength that the field winding assumes depends upon the character of the excursions of the movable contact $d^8$ in making and breaking contact with the stationary contact $d^9$, and this is determined by the current that flows through the winding $d$. During a given period the resistance is in circuit a part of the time and out of circuit the remainder of the time. If the time it is in circuit is increased, naturally the mean strength of the field will become less. The electro-magnetic winding $d$ so controls the operation of the regulator upon variations in current that the time the resistance $c$ is in circuit is increased as the main current delivered by the generator tends to increase. Accordingly the average field strength is varied inversely to the speed, and consequently the generator output or main current is confined within predetermined limits.

The first regulator that has been described will regulate the generator to a speed of about thirty-five (35) miles an hour, but when the speed rises higher, its resistance $c$ is insufficient to keep the current below the required limit, and then its electrodes $d^8$ and $d^9$ are held open and its resistance remains in circuit continuously until the speed decreases.

The second regulator then operates in the same way as the first regulator to regulate the generator, its electrodes $e^8$ and $e^9$ being opened and closed to insert and remove the resistance $c'$.

The fluctuations in voltage that occur while either regulator is in operation are practically imperceptible upon an ordinary voltmeter or ammeter, but as a matter of fact, these fluctuations have a wide amplitude and recur in rapid succession.

The fluctuations in current have an amplitude of about five (5) or more amperes, and the frequency thereof is about eight (8) or more per second.

Of course, the amplitude and frequency of the fluctuations varies and depends upon the characteristics of the generator and regulator that are employed.

While two resistances with two pairs of separable electrodes are sufficient to regulate the generator when the system is designed for 30 volt lamps, it will be understood that where the system is designed for lamps of higher voltage, I may provide more resistances and more pairs of separable electrodes. The number of resistances and corresponding pairs of electrodes are made sufficient to prevent the voltage across any pair of electrodes being so high that an arc will be drawn when said electrodes are separated. If the system has a low voltage, for instance twelve (12) volts or less, only a single regulator need be employed, as a single resistance will suffice to regulate the generator throughout the entire variations in speed, and the voltage across the electrodes will not be sufficient to form an arc.

Inasmuch as the resistance $c'$ is greater than the resistance $c$, the drop across the former, when the generator is running at high speed, is nearly equal to the voltage drop across the latter when the generator is running at a low speed. Accordingly the current broken by the electrodes $e^8$ and $e^9$ is more nearly equal to that broken by the electrodes $d^8$ and $d^9$, and consequently the wear upon the pair of electrodes $e^8$ and $e^9$ is practically the same as that upon the electrodes $d^8$ and $d^9$.

Of course, the particular system and apparatus that have been described for the purpose of explanation may be modified in various ways without in any way departing from the invention set forth herein.

Having thus described my invention what I claim as new and desire to secure by Letters Patent, is:

1. The combination of a source of mechanical power capable of being varied from zero to a maximum speed, a dynamo armature adapted to be driven by said source, a storage battery, connecting means therefor, an electromagnetic winding in said connecting means, a vibratory switch element adapted to be vibrated between its open and closed positions in response to maximum and minimum current passing through said winding, and an electromagnetic winding for controlling the voltage generated by said armature, the current passing through said last named winding being controlled by said switch element.

2. In an automatic charging apparatus, a storage battery, a dynamo armature, means for connecting said storage battery with said dynamo armature, a magnetic coil for controlling the voltage produced by said armature, a vibratory switch element adapted to control the current in said magnetic coil, and means for vibrating said switch element comprising an electromagnetic winding responsive to current delivered by said dynamo whereby the charging current automatically controls itself.

3. In combination, a storage battery, a dynamo armature, magnetic coil for controlling the voltage produced by said armature, a vibratory switch element for controlling the current in said coil, and an electroresponsive winding responsive to a predetermined condition of the energy in the charging circuit and controlling the vibration of said switch element.

4. In a battery charging and incandescent lighting system, the combination of a battery, a dynamo for charging the battery, a plurality of incandescent lamps connected with the battery, and automatic controlling means for fluctuating the voltage of the dynamo between limits and thereby maintaining a substantially constant average current delivered by the dynamo armature, irrespective of the number of incandescent lamps in use, said means comprising a vibratory switch and a winding carrying the current delivered from the dynamo armature to said battery and lamps.

5. In an automatic battery charging system, a source of power whose speed must be varied over a wide range to meet conditions in practice, a battery charging dynamo armature driven thereby, a storage battery, and an automatic vibratory controller, said controller comprising a stationary switch-contact element, a cooperating movable switch contact element, a magnetic armature whose movement controls the movement of said movable contact element, a spring tending to hold said movable contact element in its closed position, a cooperating magnetic winding connected in a circuit containing the dynamo armature, said magnetic winding and the battery in series, and a shunt winding for controlling the voltage generated by the dynamo armature, the current in said shunt winding being controlled by said contact elements, whereby when the speed of the source of power increases sufficiently, the current through said magnetic winding controls itself by causing the battery charging energy to be automatically controlled to give rapid fluctuations thereof and produce a suitable average charging current.

6. In combination, a dynamo armature, a storage battery adapted to be charged thereby, means for driving said armature, said driving means being arranged to be varied widely in rate of speed, an electromagnetic winding functionally related to said armature and controlling the output of the same, a circuit controlling vibratory switch element adapted when vibrated to fluctuate the current in said winding and thereby control the output of said armature, an electromagnetic winding responsive to the charging energy and constructed to automatically control said vibratory switch element when the energy of the charging circuit exceeds a certain condition, whereby the charging energy delivered by the armature to the battery is automatically controlled under conditions of widely variable speed of the driving means.

7. In a battery charging apparatus for motor vehicles, a dynamo armature, a series magnetic winding, a storage battery, said dynamo armature, series winding and storage battery being connected in a circuit in series with each other and the voltages of the armature and battery being opposed in said circuit, a shunt winding connected across the dynamo armature and controlling the voltage generated by said armature, a vibratory contact device, the opening and closing of which widely varies the current in said shunt winding and thereby rapidly and widely fluctuates the voltage generated by said armature and thereby rapidly and widely fluctuates the current in said series circuit, so as to integrate the current to a suitable charging current, said series magnetic winding controlling the movement of said contact device, and a spring acting counter to said series magnetic winding, whereby when the voltage generated by the armature increases and increases the current through said series magnetic winding and battery, said contact device is pulled open by a powerful magnetic pull in effecting the vibratory movements of said contact device.

8. In a dynamo lighting system for a car, a dynamo adapted to be driven by power derived from the engine, a storage battery of substantially fixed counter electromotive force and low ohmic resistance connected in a circuit including said battery and the armature of said dynamo, a magnetic coil in series with said dynamo armature and said battery, a vibratory switch element adapted to be rapidly vibrated between two definite positions, a spring tending to move said switch element to its closed position and the magnetic pull of said magnet being adapted to move said element to its open position, and means dependent upon the to and fro movement of said element for fluctuating the current output of said armature whereby when the speed of said engine exceeds a certain amount said element is automatically and rapidly vibrated to cause a rapidly fluctuating charging current.

9. In a lighting system for a motor car having an engine as the source of motive power, a dynamo adapted to be driven by said engine, a storage battery of substantially fixed counterelectromotive force and low internal resistance connected in a circuit including the armature of said dynamo, and electroresponsive means responsive to the charging current supplied by said armature for causing the production by said armature of a rapidly fluctuating charging current which integrates to a substantially constant average current, said means comprising a vibratory switch element rapidly and positively moved in one direction in response to maximum current to reduce the current, and rapidly and positively moved in the other direction to increase the current.

10. The combination of a storage battery having translating devices in parallel therewith, a dynamo armature, means for connecting said armature and said battery in a closed circuit, a winding for controlling the voltage generated by the armature and connected across said circuit, a vibratory switch in circuit with said winding and for controlling the current in said winding, and a winding responsive to the entire current supplied by said armature to said battery and translating devices for automatically vibrating said switch.

11. A lighting system in which are combined a variable speed shunt field generator, a storage battery charged thereby, lamps operated by either said generator or said storage battery, a generator regulator having a fixed resistance arranged in the shunt field circuit, a switch for inserting and removing said resistance, and an electromagnet connected in circuit in series between said generator and said storage battery and lamps and operating said switch, the generator being regulated by said regulator to fluctuate its energy between two limits to operate said regulator, and the fluctuations in energy being absorbed by said battery to keep the energy upon the lamps substantially constant.

12. In combination with a storage battery, automatic battery charging means comprising a dynamo armature, an electromagnetic winding responsive to an increase in the output of said armature, a vibratory circuit controlling element automatically and suddenly moved when said output causes a certain maximum condition in the charging circuit, means controlled by said element for effecting a decrease in the output, and means for automatically and suddenly moving said element to another position when the output has been reduced whereby said element is automatically vibrated so that the battery is automatically charged by energy fluctuating between certain maximum and minimum limits.

13. The combination of a storage battery, a dynamo armature, translating devices, and electrical connections cooperating therewith, said electrical connections comprising a magnetic coil connected in shunt with said armature, a vibratory switch element for controlling the magnetic effect of said coil, and a magnetic coil for controlling the vibration of said switch element, said last named magnetic coil being energized by the current supplied to said battery and to said translating devices by said dynamo armature.

14. In combination with a battery, automatic battery charging means comprising a source of mechanical power, the speed of which is adapted to vary from a certain speed to more than twice such speed, a dynamo electric winding producing electric energy derived from said source of mechanical power, means for connecting said winding to the battery for charging said battery, and means for causing said dynamo electric winding to produce a series of unidirectional fluctuations of energy for charging said battery, said latter means comprising an automatically vibrated circuit controlling element the vibration of which is dependent upon the electrical condition of the charging circuit.

15. The combination with a self-propelled vehicle, of an automatic electric lighting system comprising a dynamo armature driven by the motor of the vehicle, a storage battery, a plurality of incandescent lamps adapted to be connected in parallel with said battery, and controlling means for controlling the output of said dynamo, said controlling means comprising a magnetic coil carrying the entire current supplied to said battery and said lamps, a spring actuated vibratory switch automatically closed by its spring and automatically opened by the magnetic effect of said magnetic coil, and a second magnetic coil controlled by said switch and controlling the output of said armature.

16. In an automatic lighting system for a self-propelled vehicle, the combination with the engine of the vehicle, of an automatically controlled dynamo, a storage battery connected across the armature of said dynamo, lamps adapted to be connected in parallel with said battery, and automatic controlling means for said dynamo, said controlling means comprising a vibratory switch responsive to fluctuations of the energy output of the dynamo and causing by its vibration such fluctuations to maintain a proper average charging current.

17. The combination with a propelled vehicle, of an automatic electric lighting system comprising a dynamo armature driven by the motor of the vehicle, a storage battery, a plurality of incandescent lamps adapted to be connected in parallel with said battery, and controlling means for controlling the output of said dynamo, said controlling means comprising a magnetic coil carrying the entire current supplied to said battery and said lamps, a spring actuated vibratory switch automatically closed by its spring and automatically opened by the magnetic effect of said magnetic coil, and a second magnetic coil controlled by said switch and controlling the output of said armature.

18. In an automatic lighting system for a propelled vehicle, the combination with the engine of the vehicle of an automatically controlled dynamo, a storage battery connected across the armature of said dynamo, lamps adapted to be connected in parallel with said battery, and automatic controlling means for said dynamo, said controlling means comprising a vibratory switch responsive to fluctuations of the energy output of the dynamo and causing by its vibration such fluctuations to maintain a proper average charging current.

19. A system comprising a variable speed generator, a storage battery charged thereby, a vibratory switch, a winding in series with said battery to vibrate said switch and means controlled by said switch to regulate said generator.

20. A lighting system comprising a variable speed generator having a shunt field, a storage battery connected to be charged thereby, lamps connected to be operated either by said generator or by said storage battery, a resistance arranged in the shunt field circuit of the generator, a vibratory contact normally engaging another contact to short circuit said resistance and an electromagnetic winding connected in circuit in series between said generator and said storage battery and arranged to vibrate said vibratory contact.

21. A lighting system having in combination, a shunt field generator, a storage battery charged thereby, lamps operated by either said generator or said storage battery, a generator regulator having a fixed resistance arranged in the shunt field circuit, an electromagnet connected in circuit to respond to the generator energy, and a switch operated by said magnet to insert and remove said resistance, the generator being regulated by said regulator to fluctuate its energy between two limits to operate said regulator and the storage battery acting to absorb the fluctuations in energy to keep the energy upon the lamps substantially constant.

22. A lighting system comprising a variable speed generator having a shunt field, a storage battery charged thereby, lamps operated by either the generator or storage battery, an electromagnetic winding in series between the generator and the storage battery and lamps, a normally closed vibratory contact actuated by said winding, a spring acting upon said contact in opposition to the winding, and a resistance rapidly thrown into circuit with the shunt field when the contact is open and out of circuit with the shunt field when the contact is closed as the vibratory action of the contact is produced by the resultant rise and fall of the current flowing through said winding.

23. A lighting system having a variable speed shunt field generator, a storage battery charged thereby, lamps operated by either the generator or battery, an automatic switch to control the circuit between the generator and the battery, a resistance arranged in the shunt field circuit of said generator, a vibratory contact normally biased to closed position to remove said resistance, and an electromagnet to vibrate said contact so as to cause the generator voltage to rise and fall and cause a pulsating current to be delivered to the battery.

24. A lighting system having a variable speed shunt field generator, a storage battery charged thereby, lamps operated by either the generator or battery, an automatic switch to control the circuit between the generator and the battery, a resistance arranged in the shunt field circuit of said generator, a vibratory contact normally biased to closed position to short circuit said resistance, and an electromagnet to vibrate said contact so as to cause the generator voltage to rise and fall and cause a pulsating current to be delivered to the battery.

25. A lighting system having a variable speed shunt field generator, a storage battery charged thereby, lamps operated by either the generator or battery, an automatic switch to control the circuit between the generator and the battery, a resistance arranged in the shunt field circuit of said generator, a vibratory contact normally biased to closed position to remove said resistance, and an electromagnet in circuit between the generator and battery to vibrate said contact so as to cause the generator voltage to rise and fall and cause a pulsating current to be delivered to the battery.

26. The method of regulating the energy in a lighting system having a variable speed generator, a storage battery, lamps, and a generator regulator, which consists in regulating the generator to fluctuate its energy between two limits to operate said regulator, the fluctuations in energy being absorbed by the battery to keep the energy upon the lamps substantially constant.

27. The method of charging a storage battery which consists in generating by magnetic induction unidirectional electric energy, and controlling the energy according to the amperage to vary the amperes from a certain minimum to a certain maximum, thereby producing rhythmic fluctuations in the battery charging energy, while maintaining the average effect of the current constant independently of the voltage of the battery.

28. The method of controlling a work circuit comprising a storage battery with incandescent lamps in parallel therewith, which consists in increasing the voltage until the current in the work circuit reaches a certain maximum, then reducing the voltage until the current in the work circuit reaches a certain minimum, then increasing the voltage until the maximum condition is reached, and repeating the described cycle of operation in accordance with the amperes in the work circuit thereby maintaining a substantially constant average current in the total work circuit.

29. The method of controlling a battery charging dynamo driven at widely different speeds, which consists in controlling the energy supplied by the dynamo to the battery by rapidly opening and closing a controlling circuit and thereby controlling the energy output of the dynamo, said opening and closing being in accordance with changes between maximum and minimum limits of the energy of the dynamo.

30. The method of controlling the energy delivered by a dynamo armature to a work circuit across which are connected a storage battery and incandescent lamps in parallel with each other, which consists in rapidly moving a circuit controlling element to two definite different positions alternately in response to changes in the energy supplied from the armature to the work circuit, whereby rhythmic fluctuations of the energy in the circuit are produced.

31. The method of maintaining a current constant at a desired average rate, which consists in increasing the current to a certain maximum, controlling a circuit controlling element to reduce the current to a certain minimum, and then controlling said element to increase the current to said maximum, and repeating said steps as often as required to maintain the average current substantially constant.

32. The method of controlling the output of a dynamo electric armature, which consists in connecting the armature to a storage battery when its voltage reaches a predetermined value, controlling the energy in a work circuit connected across the armature and comprising said battery when the current supplied the circuit exceeds a certain maximum limit by reducing the output of the armature until a certain minimum current is reached, then controlling the output of the armature by increasing the output of the same until the said maximum current is again exceeded, and repeating the said steps successively.

33. The method of maintaining substantially constant the average rate of charging energy delivered to a storage battery by a dynamo armature driven at speeds varying over a wide range, which consists in fluctuating the rate of energy between a certain minimum and a certain maximum, and varying the percentage of time when the minimum current is in use as compared with the total time.

34. The method of controlling a current supplied to a circuit across which is connected a storage battery, which consists in rapidly fluctuating the voltage of a dynamo electric charging winding from a voltage materially higher than that of the battery to a lower voltage, and controlling the maximum limit of voltage in response to a maximum current, whereby a rapidly fluctuating current is produced while the average charging current is kept reasonably constant at a desired rate.

35. The method of controlling the current supplied to a circuit across which are connected in parallel a storage battery and incandescent lamps, which consists in producing mechanical power at widely different speeds, driving an electric generating device by such power, and supplying a series of rapidly recurrent fluctuations of unidirectional energy to the circuit between maximum and minimum amounts of energy.

36. The method of charging a battery at a predetermined number of average amperes, which consists in supplying to the battery a series of waves of energy, controlling the maximum amperage of such waves by controlling the voltage of the source of supply in response to a maximum charging current, and varying the rate of waves per second whereby the average amperage is maintained substantially constant.

37. The method of maintaining substantially constant the average watt output of a dynamo armature driven at widely different speeds, which consists in connecting the armature to a storage battery, increasing the voltage of the armature until the charging current reaches a predetermined maximum, then reducing the voltage of the armature, then again increasing the voltage until the charging current reaches said predetermined maximum, repeating the said cycle of operations and varying the number of such cycles per second in response to changes of speed of the source of power for the armature.

38. The method of operating incandescent lamps at a substantially constant voltage when the source of power has a widely variable speed, which consists in connecting said lamps across a storage battery, supplying the battery and lamps from a dynamo electric winding in waves of energy controlled according to the total current at a rate of waves per second dependent upon the speed of the variable speed source, whereby the average current supplied is substantially independent of changes in the speed of the source of power.

39. The method of charging a battery which consists in generating electric energy by magnetic induction, supplying energy to the battery and increasing the voltage of the energy until the amperes reach a predetermined maximum, then reducing the voltage of the energy, then increasing the voltage until the amperes again reach the said maximum and repeating the stated cycle of operation, whereby the charging energy is produced in a series of controlled re-current fluctuations, whose effective value is that of a constant current.

40. The method of controlling a battery charging current which consists in causing the current to rise to a predetermined amount, then reducing the current in response to said maximum current, then again increasing the current to the said maximum and again reducing it in response to said maximum current.

41. The method of controlling a battery charging current which consists in increasing the charging energy until a predetermined maximum electrical condition of the charging circuit is reached, then reducing the energy in response to said maximum condition, then again increasing and decreasing the energy as described and repeating the stated steps.

42. The method of controlling storage battery charging energy which consists in generating unidirectional energy, and causing the charging energy to control itself so as to produce a series of rapidly recurrent fluctuations of uninterrupted unidirectional energy.

43. The method of controlling electric energy which consists in producing unidirectional energy, and causing the energy produced to control the source of energy so as to produce a series of rapidly recurrent fluctuations of uninterrupted unidirectional energy.

44. The method of controlling the current supplied to a circuit containing a storage battery and incandescent lamps in parallel with each other which consists in dynamo-electrically generating current, passing said current through the circuit, fluctuating the current by increasing the current until a certain predetermined maximum is reached then reducing the current until a certain predetermined minimum is reached and so varying the rate of fluctuations per second as to maintain a substantially constant average current, irrespective of a wide change of speed of the source of power, irrespective of the voltage of the battery and irrespective of the number of lamps in use.

45. The method of controlling the current supplied by a dynamo armature to a storage battery and to incandescent lamps connected in parallel across the terminals of the battery, said battery having its electromotive force opposing that of the armature, which consists in suddenly increasing the voltage generated by the armature until the current supplied thereby reaches a certain maximum, then suddenly reducing the armature voltages until the current supplied by the armature reaches a certain minimum, then suddenly increasing the voltage generated by the armature as before, and repeating the sudden increase and decrease of voltage according to said changes in current supplied by the armature, whereby the current supplied by the armature is maintained at the desired average amount without substantially varying the voltage across the battery and lamps.

46. The method of controlling the current in a circuit, which consists in developing two electromotive forces in a circuit which are opposed to each other, one of which is substantially constant and the other of which is variable and alternately increasing and decreasing the variable voltage in accordance with change of the current while maintaining the variable voltage above that of the constant voltage, whereby the flow of current is maintained at a substantially constant average amount.

47. The method of controlling the current supplied to a plurality of incandescent lamps in parallel with each other and to a storage battery in parallel with said lamps, which consists in supplying a substantially non-fluctuating current through said lamps, supplying fluctuating current through said battery, the said fluctuating current being fluctuated between a certain maximum and a certain minimum value alternately, and controlling said fluctuating current according to changes in the total current supplied to said battery and said lamps, the time intervals between the fluctuations being controlled to cause the average total supplied to the battery and lamps to be substantially constant.

48. The method of applying a desired average current from a dynamo armature to a plurality of incandescent lamps and a storage battery in parallel with each other, which consists in rapidly increasing the voltage of the dynamo until the current in the circuit reaches a certain maximum greater than the desired average current, then rapidly reducing the voltage of the dynamo until the current in the circuit reaches a certain minimum less than the desired average current, and repeating this cycle of operations with such a frequency as to produce the desired average current.

49. The method of supplying current from a dynamo to a group of translating devices connected in parallel with each other and one of said devices having low ohmic resistance and a substantially constant counter electromotive force, which consists in rapidly and alternately increasing and decreasing the voltage of the dynamo in accordance with the change of the total current between a certain maximum and a certain minimum supplied to said devices, whereby the average total current is maintained substantially constant and the voltage across the devices is maintained substantially constant.

50. The method of controlling the output of a dynamoelectric armature, which consists in connecting the armature to a storage battery when its voltage reaches a predetermined value, controlling the energy in a work circuit connected across the armature and comprising said battery when the energy supplied the circuit exceeds a certain maximum limit by reducing the output of the armature until a certain minimum output of energy is reached, then controlling the output of the armature by increasing the output of the same until the said maximum energy is again exceeded, and repeating the said steps successively.

51. A lighting system having a variable speed generator, a storage battery charged thereby, lamps operated by either the generator or the storage battery, a series electromagnetic winding in circuit between the generator and the storage battery and lamps, a movable vibratory contact actuated by said winding, a spring for said contact acting in opposition to the magnetic effect of the winding, and means controlled by the vibratory action of said contact for governing the current output of the generator.

52. A lighting system comprising a variable speed generator having a shunt field, a storage battery charged thereby, lamps operated by either the generator or the storage battery, a series electromagnetic winding in circuit between the generator and the storage battery and lamps, a movable vibratory contact actuated by said winding, a spring for said contact acting in opposition to the magnetic effect of the winding, and means controlled by the vibratory action of said contact for governing the field of the generator.

53. A lighting system having a variable speed generator with a shunt field, a storage battery charged thereby, lamps operated by either the generator or the storage battery, an electromagnetic winding in series between the generator and the storage battery and lamps, a movable vibratory contact actuated by said winding, a spring acting upon said contact in opposition to the winding, and a resistance effectively thrown into and out of circuit with the generator shunt field by the vibratory action of said contact to maintain a substantially constant average output.

54. A lighting system comprising a variable speed generator having a shunt field, a storage battery charged thereby, lamps operated by either the generator or storage battery, an electromagnetic winding in series between the generator and the storage battery and lamps, a normally closed vibratory contact actuated by said winding, a spring acting upon said contact in opposition to the winding, and a resistance rapidly thrown into circuit with the shunt field when the contact is open and out of circuit with the shunt field when the contact is closed as the vibratory action of the contacts is produced by the resultant rise and fall of the current flowing through said winding.

55. The combination with a vehicle, of an automatic electric lighting system comprising a dynamo armature driven by the vehicle, a storage battery, a plurality of incandescent lamps adapted to be connected in parallel with said battery, and controlling means for controlling the output of said dynamo, said controlling means comprising a magnetic coil carrying the entire current supplied to said battery and said lamps, a spring actuated vibratory switch automatically closed by its spring and automatically opened by the magnetic effect of said magnetic coil, and a second magnetic coil controlled by said switch and controlling the output of said armature.

56. In an automatic lighting system for a vehicle, the combination with the drive of the vehicle, of an automatically controlled dynamo, a storage battery connected across the armature of said dynamo, lamps adapted to be connected in parallel with said battery, and automatic controlling means for said dynamo, said controlling means comprising a vibratory switch responsive to fluctuations of the energy output of the dynamo and causing by its vibration such fluctuations to maintain a proper average charging current.

57. A lighting system in which are combined a variable speed shunt field generator, a storage battery charged thereby, lamps operated either by said generator or said storage battery, a generator regulator having a fixed resistance arranged in the shunt field circuit, a switch for inserting and removing said resistance, and means for opening and closing said switch in accordance with the generator energy to insert and remove said resistance, the generator being regulated by said regulator to fluctuate its energy between two limits and the fluctuations in energy being absorbed by said battery to keep the energy upon the lamps substantially constant.

STEPHEN W. EVERETT.

Witnesses:
W. M. FORBES,
MATILDA WIEDLING.